No. 769,746. PATENTED SEPT. 13, 1904.
A. M. HEWLETT.
PIPE HANGER.
APPLICATION FILED DEC. 11, 1901.
NO MODEL. 2 SHEETS—SHEET 1.
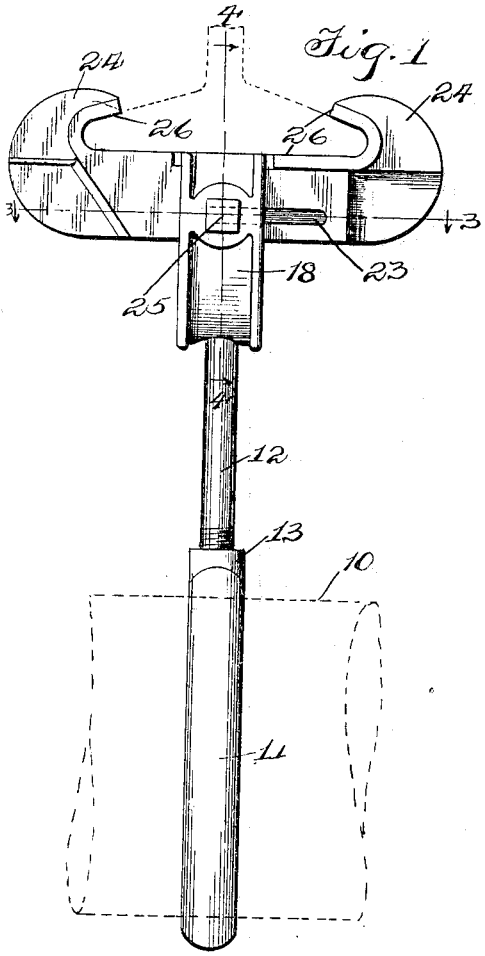
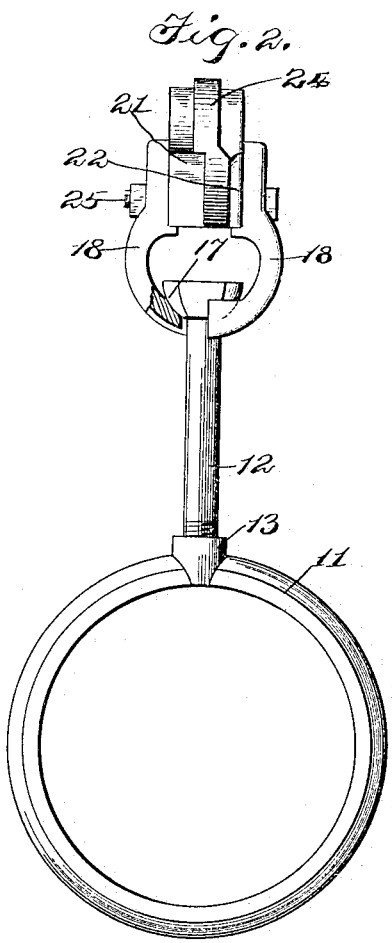
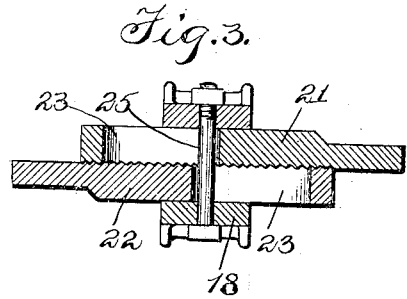
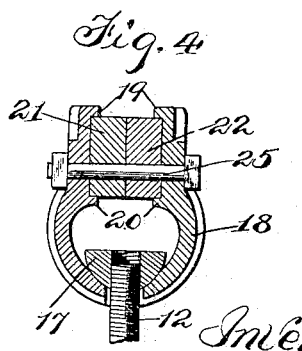
Witnesses
J. B. Weir
Inventor
Alfred M. Hewlett,
by Bond, Adams, Pickard & Jackson
his Att'ys

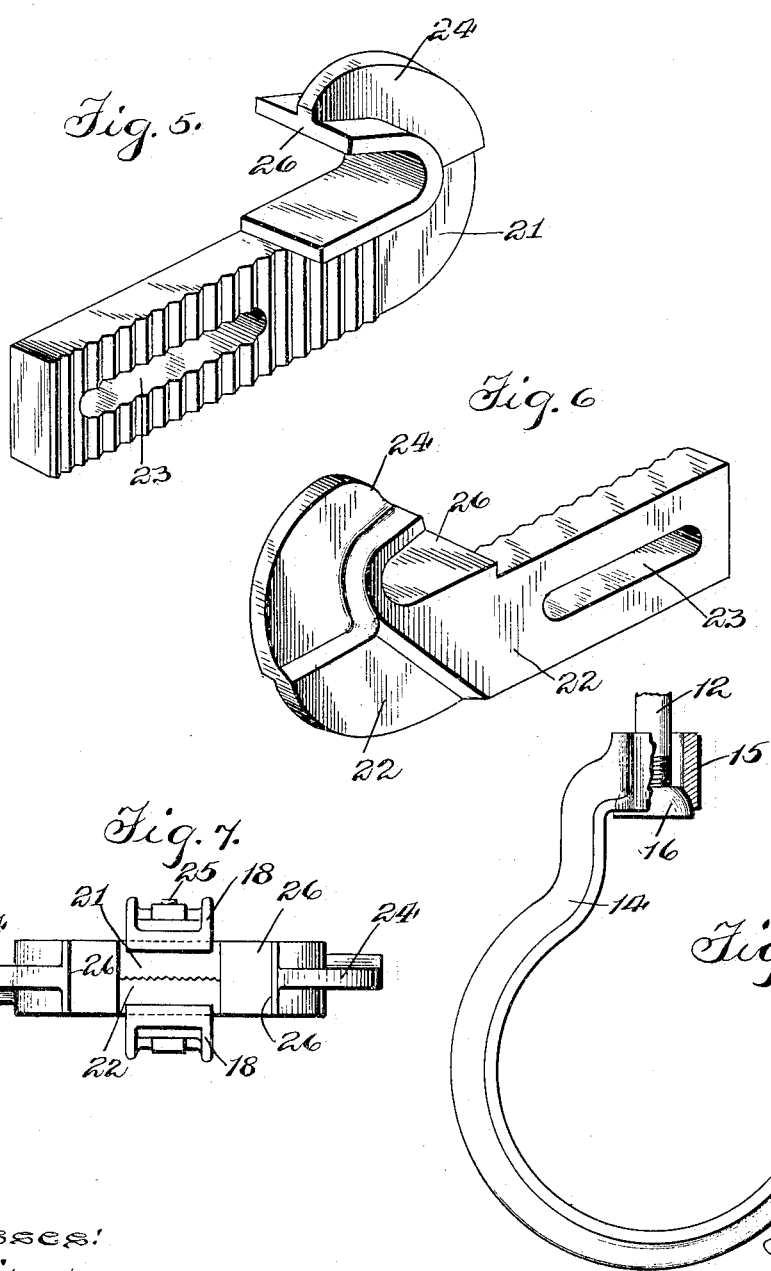

No. 769,746. Patented September 13, 1904.

UNITED STATES PATENT OFFICE.

ALFRED M. HEWLETT, OF KEWANEE, ILLINOIS.

PIPE-HANGER.

SPECIFICATION forming part of Letters Patent No. 769,746, dated September 13, 1904.

Application filed December 11, 1901. Serial No. 85,475. (No model.)

*To all whom it may concern:*

Be it known that I, ALFRED M. HEWLETT, a citizen of the United States, residing at Kewanee, in the county of Henry and State of Illinois, have invented certain new and useful Improvements in Pipe-Hangers, of which the following is a specification, reference being had to the accompanying drawings.

My invention relates to hangers for suspending steam, water, or other pipes, and has for its object to provide an improved pipe-hanger which will be especially adapted for use in modern steel-frame buildings. In buildings of this description it is usual to secure the pipe-hanger to the flanges of the girders or horizontal I-beams which support the floors; and my invention consists in certain improvements by which the hanger may be easily put in place and may be readily adjusted to fit I-beams of different sizes without interfering with its strength and rigidity.

What I regard as new will be set forth in the claims.

In the accompanying drawings, Figure 1 is a side elevation of my improved pipe-hanger. Fig. 2 is an end view, part being in section. Fig. 3 is a horizontal section on line 3 3 of Fig. 1. Fig. 4 is a vertical section on line 4 4 of Fig. 1. Figs. 5 and 6 are perspective views of the jaws forming the clamp. Fig. 7 is a plan view of the hanger, and Fig. 8 is a detail illustrating a different form of attaching device for the pipe.

Referring to the drawings, 10 indicates the pipe which is to be supported, said pipe being shown in dotted lines in Fig. 1.

11 indicates a ring which is placed upon the pipe and is carried at the lower end of a rod 12, as shown in Figs. 1 and 2. The lower end of the rod 12 is screw-threaded, fitting into a screw-threaded socket in a boss 13, carried by the ring 11, so that said ring may be readily attached to or removed from the rod 12.

It will be understood that the pipe is supported by a number of the rings 11, each of which is suspended, by means of the rod 12, from a suitable clamp attached to the girder. Instead of using rings 11, as shown in Figs. 1 and 2, I may employ hooks 14, as shown in Fig. 8. The advantage of the hooks 14 over the rings 11 is that they may readily be applied to the pipe after it has been connected up and is placed in position, whereas the rings 11 must be fitted upon the pipe before it is put in place. Furthermore, as shown in Fig. 8, the hook 14 is adjustably secured to the rod 12 by extending the lower end of the rod through a sleeve 15 at the upper end of the hook and providing a rounded head 16 at the lower end of the rod 12, screw-threaded thereupon, as shown. The lower end of the sleeve 15 is beveled to fit the rounded surface of the head 16, so that the hook 14 may adjust itself freely to compensate for the expansion and contraction of the pipe. This construction, however, is not herein claimed, as it forms a part of the subject-matter of my application, Serial No. 85,476, filed on even date herewith. As shown in Fig. 8, the lower end of the hook 14 extends upward far enough to prevent accidental displacement of the pipe. If desired, the hooks 14 may be turned alternately in opposite directions, so as to avoid any possible danger of the pipe becoming detached.

As best shown in Fig. 2, the upper end of the rod 12 is provided with a rounded head 17, which rests in a suitable bearing in a two-part support 18, the construction of which is best shown in Fig. 4. As shown in said figure, said support when its parts are assembled is substantially U-shaped, its upper ends being separated and its lower ends fitting together around the upper end of the rod 12 and below the head 17, forming a bearing for said head.

19 20 indicate upper and lower flanges, respectively, extending inward from the opposing faces of the upper ends of the support 18.

21 22 indicate clamp members which are adapted to fit between the upper ends of the support 18 and to lie in the channels formed by the flanges 19 20, as shown in Fig. 4. The shape and construction of the clamp members 21 22 are best shown in Figs. 5 and 6. Said clamp members are substantially alike, each consisting of a stem having a slot 23 extending longitudinally thereof and a jaw or hook 24, formed at one end thereof. The hooks 24 are adapted to hook over the flanges of an I- beam, as shown in Fig. 1. The clamp members 21 22 are adapted to be fitted together, so that their stems lie parallel with each other and their hooks are opposite each other, the slots 23 being then in register. Obviously by adjusting the clamp members toward or from each other the distance between their hooks may be increased or diminished, thereby adapting them to fit beams of different sizes.

When the clamp members are fitted together, as above described, they lie in the channels formed by the flanges 19 20 of the support 18, as shown in Fig. 4, and all the parts are held rigidly together by a bolt 25 passing through the upper ends of the support 18 and through the slots 23 in the clamp members. In order to guard against accidental disarrangement of the clamp members, their inner surfaces are corrugated, as shown in Fig. 5, so that it is necessary to separate them slightly in order to adjust them. This may be accomplished by simply loosening the nut on the bolt 25, which permits the upper ends of the split support 18 to separate sufficiently to allow adjustment of the clamp members. The flanges 19 20 prevent rocking of the clamp members and hold them at a fixed angle to the support 18. To further hold the parts rigid, in each of the hooks 24 is provided a flange 26, which not only provides a broad bearing-surface for the hook, but also projects laterally, as shown in Figs. 5 and 6, the flange 26 of the clamp member 21 extending over the adjacent end of the clamp member 22, while the flange 26 of the clamp member 22 projects over the adjacent end of the clamp member 21. The position of the parts when assembled is shown in Figs. 1 and 7.

It will be seen that by the construction described it is impossible for the clamp members to get out of alinement and that when the nut is tightened on the bolt 25 the clamp is absolutely rigid and cannot get out of position. It may, nevertheless, be readily adjusted and applied to or removed from the beam. Furthermore, the rod 12 being supported by a substantially universal bearing in the yoke 18 variations due to expansion, contraction, or other causes are compensated for, and as the hanger is not subjected to wrenching strains it may with safety be made of cast-iron without danger of fracture. This latter feature, however, as already explained, is not claimed herein, as it forms part of the subject-matter of my application hereinbefore referred to.

While I have described particularly the form of hanger illustrated, I wish it understood that my invention is not restricted to the specific details described except in so far as they are specially claimed.

That which I claim as my invention, and desire to secure by Letters Patent, is—

1. A pipe-hanger comprising a support composed of separable members, means depending therefrom for engaging the pipe, and adjustable clamping members rigidly secured between the members of said support, substantially as described.

2. A pipe-hanger consisting of clamp members adapted to be secured together, an adjustable clamping-support engaging the outer surfaces of said clamp members for binding said clamp members together, and means carried by said support for engaging and suspending said pipe, substantially as described.

3. A pipe-hanger consisting of clamp members adapted to be secured together, an adjustable clamping-support engaging the outer surfaces of said clamp members for binding said clamp members together, and preventing angular adjustment of said clamp members with reference to each other, and means carried by said support for engaging and suspending the pipe, substantially as described.

4. A pipe-hanger consisting of a U-shaped support, clamp members each consisting of a slotted stem carrying a hook, said stems being fitted between the separated ends of said support, a bolt passing through said slots and the upper ends of said support, said support having flanges that embrace said stems, and depending means connected to said support for engaging the pipe, substantially as described.

5. A pipe-hanger consisting of a U-shaped support, clamp members fitted between the separated ends of said support, means for binding the ends of said support together and to said clamp members, each of said clamp members consisting of a slotted stem carrying a hook, said stems having laterally-projecting flanges, and depending means connected to said support for engaging the pipe, substantially as described.

ALFRED M. HEWLETT.

Witnesses:
W. H. WRIGHT,
CHAS. F. CULLOM.